(12) United States Patent
Koopman et al.

(10) Patent No.: US 6,497,062 B1
(45) Date of Patent: Dec. 24, 2002

(54) IDENTIFICATION TAG

(76) Inventors: Gene T. Koopman, 13898 Archibald Ave., Ontario, CA (US) 91761; Henry G. Koopman, 13898 Archibald Ave., Ontario, CA (US) 91761

( * ) Notice: Subject to any disclaimer, the term of this patent is extended or adjusted under 35 U.S.C. 154(b) by 0 days.

(21) Appl. No.: 09/668,727

(22) Filed: Sep. 22, 2000

(51) Int. Cl.$^7$ .................................................. G09F 3/00
(52) U.S. Cl. ........................................... 40/301; 40/615
(58) Field of Search .......................... 40/302, 301, 594, 40/615, 580, 582, 612; 428/187; 156/252

(56) References Cited

U.S. PATENT DOCUMENTS

| | | |
|---|---|---|
| 427,075 A | 5/1890 | Haaff |
| 469,033 A | 2/1892 | Allen |
| 700,483 A | 5/1902 | Emeis |
| 1,596,017 A | 8/1926 | Harnish |
| 1,674,047 A | 6/1928 | Bombard et al. |
| 2,125,768 A | 8/1938 | Christensen et al. |
| 2,135,538 A | 11/1938 | Sherman et al. |
| 2,224,043 A | 12/1940 | Flückiger |
| 2,331,636 A | 10/1943 | Stone |
| 2,356,332 A | 8/1944 | Malmer |
| 2,586,978 A | 2/1952 | Murray |
| 2,637,922 A | 5/1953 | Dryden |
| 2,654,169 A | 10/1953 | Dryden |
| 2,739,909 A | 3/1956 | Rosenthal |
| 2,805,499 A | 9/1957 | Nutter, Jr. et al. |
| 3,035,267 A | 5/1962 | Vögtlin |
| 3,063,864 A | 11/1962 | Norman |
| 3,198,688 A | 8/1965 | Yoder |
| 3,260,007 A | 7/1966 | Hayes |
| 3,320,089 A | 5/1967 | Bourgeois |
| 3,346,980 A | 10/1967 | Wallace |
| 3,379,814 A | 4/1968 | Bracey, Jr. |
| 3,453,097 A | 7/1969 | Häfner |
| 3,499,416 A | 3/1970 | Thorsheim |
| 3,552,051 A | 1/1971 | Ritchey |
| 3,574,657 A | 4/1971 | Burnett |
| 3,578,538 A | 5/1971 | Prosser et al. |
| 3,683,408 A | 8/1972 | Kinley et al. |
| 3,699,644 A | 10/1972 | Cocca |
| 3,731,414 A | 5/1973 | Murphy et al. |
| 3,765,113 A | 10/1973 | Magee |
| 3,826,030 A | 7/1974 | Read |
| 3,940,864 A | 3/1976 | Kanzelberger |
| 3,952,439 A | 4/1976 | Armand |
| 3,958,353 A | 5/1976 | Hayes |
| 3,961,112 A | 6/1976 | Genevitz et al. |
| 3,965,602 A | 6/1976 | Whitney |
| 4,021,952 A | 5/1977 | Brierley |
| 4,060,921 A | 12/1977 | Robinson |
| 4,102,073 A | 7/1978 | Hayes |
| 4,365,436 A | 12/1982 | Ritchey |
| 4,442,618 A | 4/1984 | Minter et al. |
| RE31,940 E | 7/1985 | Ritchey |
| 4,544,586 A | 10/1985 | Molari, Jr. |
| 4,579,768 A * | 4/1986 | Post ............................ 40/615 |
| 4,612,877 A | 9/1986 | Hayes et al. |
| 4,718,374 A | 1/1988 | Hayes |
| 4,748,757 A | 6/1988 | Howe |
| D337,397 S | 7/1993 | Kerola |
| 5,725,261 A | 3/1998 | Rahn |
| 5,855,969 A | 1/1999 | Robertson |
| 5,862,599 A | 1/1999 | Johnson, Jr. et al. |
| 6,061,940 A * | 3/2000 | Rice ............................ 40/594 |

* cited by examiner

Primary Examiner—Cassandra H. Davis
(74) Attorney, Agent, or Firm—Wells St. John P.S.

(57) ABSTRACT

An identification tag is described in which a first tag member is formed of a polymer and includes a front surface. A second tag member, also formed of a polymer but that visually contrasts with the first tag member, includes slots formed as visual indicia that extend through the second tag member. The second tag member is welded to the first tag member to expose the front surface of the first tag member through the slots.

10 Claims, 3 Drawing Sheets

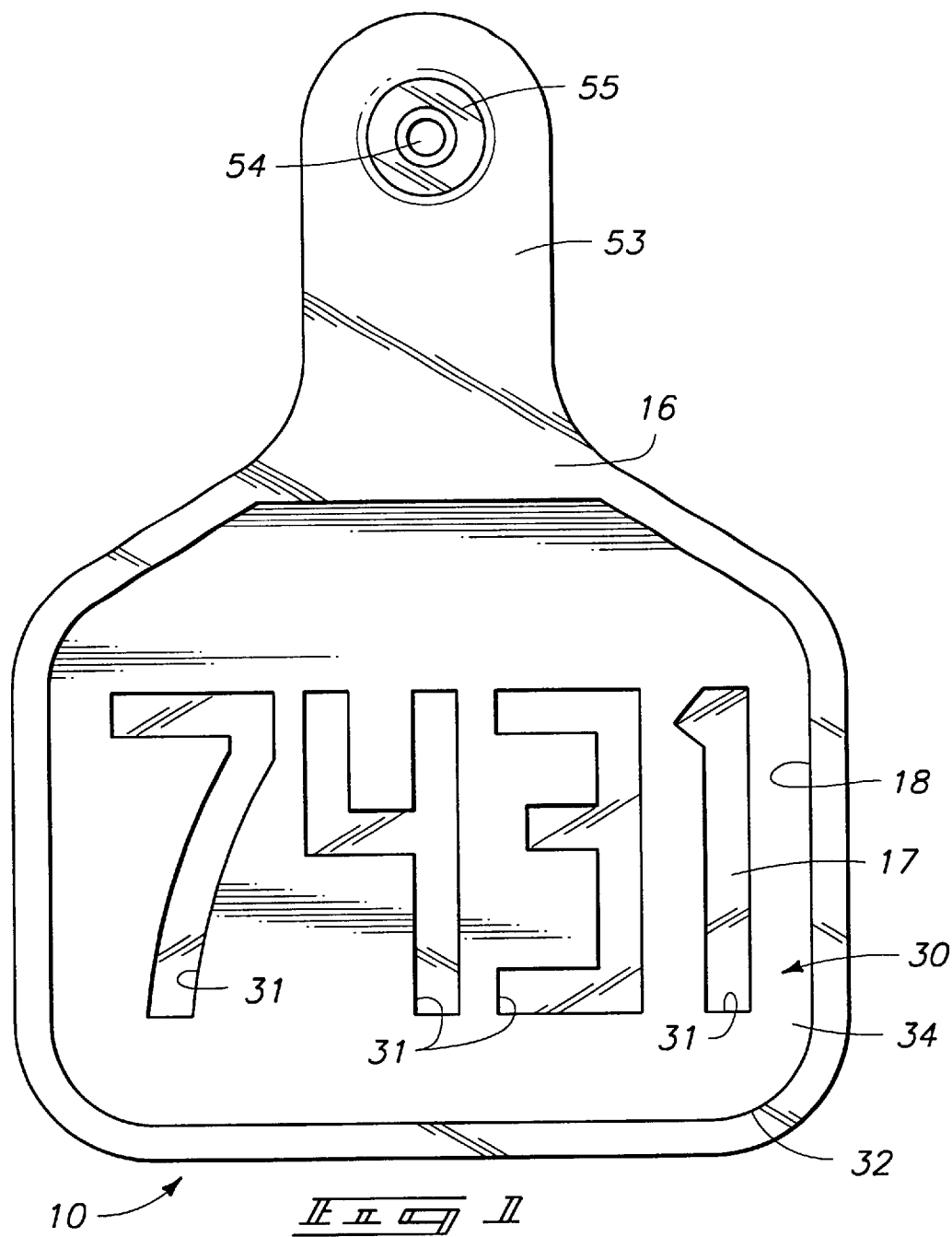
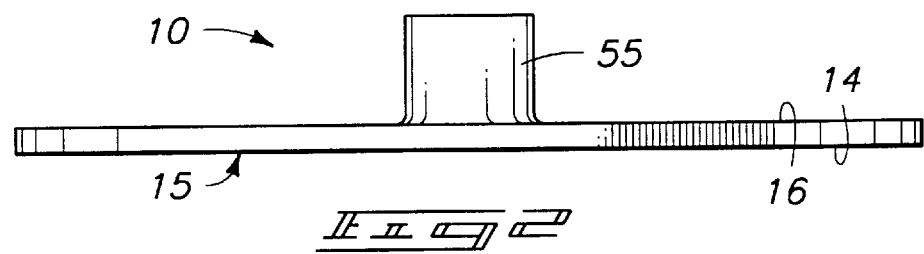

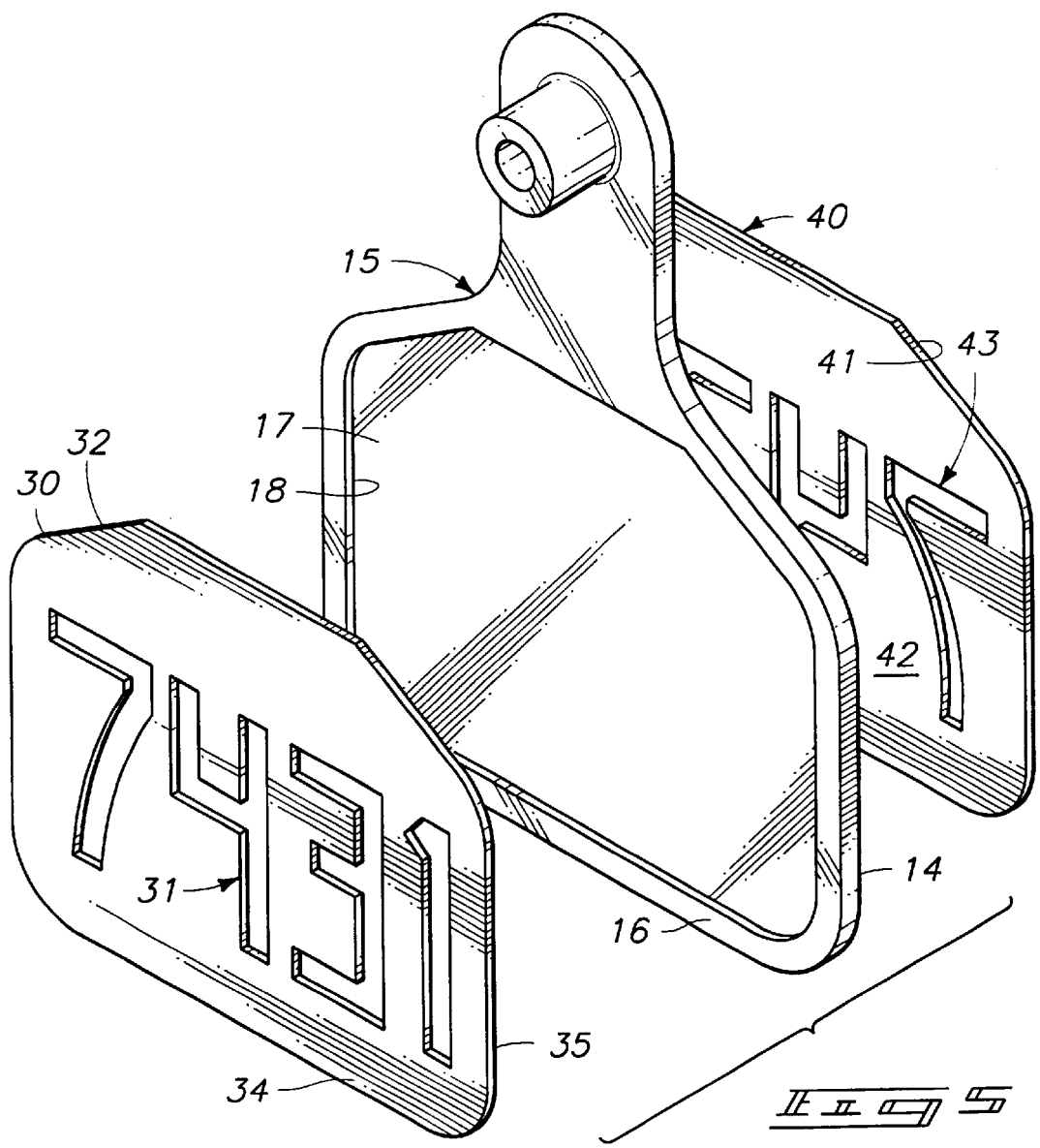
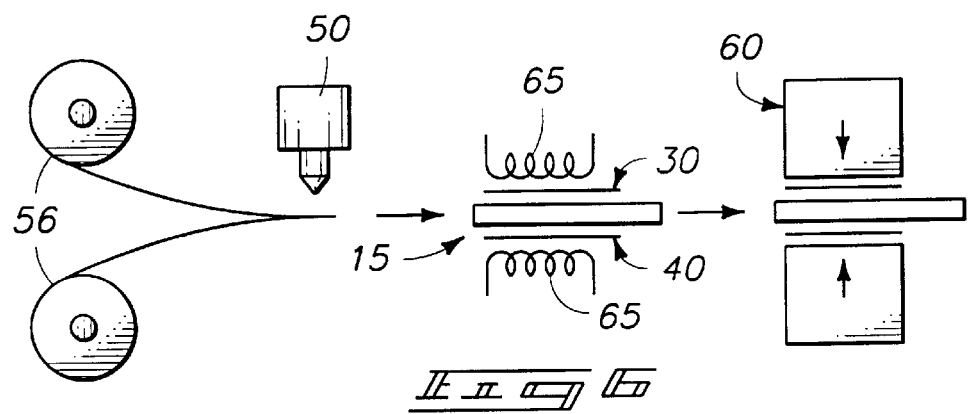

IDENTIFICATION TAG

TECHNICAL FIELD

The present invention relates generally to identification tags, and more particularly to animal identification apparatus with visual indicia used to identify specific animals.

BACKGROUND OF THE INVENTION

Those needing to label something for identification purposes will typically make use of an identification tag that visually communicates some form of identification. For example those in the business of dairying or ranching often need to use some method of identifying individual animals. Ear tags with individual identification indicia may be used for record keeping, herd separation, medicinal, feed or other important purposes where identification of specific animals is desired.

Many different materials and methods have been developed for identification tags. Many commercial tags are presently formed of a resilient plastic, which in the instance of animal tagging, are attached to an ears of animals by plastic spikes. The spike is driven through the ear. A barbed end of the spike is received through an aperture in the tag to hold the tag permanently in place on the ear. The spikes and tags hold well, but the identification indicia on the tag is often subject to such wear and exposure to adverse elements that the indicia often becomes difficult or impossible to read.

Perhaps the most currently used method of applying visual indicia on identification tags, especially animal tags, has simply been embossing or silk screening indicia on a plastic tag body. This may be accomplished with a paint or other coating used to form the visual indicia. While this works well temporarily, after constant exposure of the tags to varying environmental conditions and wear, the indicia will usually still become vague and difficult to read.

As a proposed solution to the above problem, tags have been developed in which laminated layers of flexible plastic material are used. The base layer is formed using a first color, and the second layer is formed using a second color. The two layers are typically secured together by application of adhesive to the joining surfaces. A high speed etching tool is used to grind or rout identification indicia through the second layer, thereby exposing the first layer. In other systems, a heated stylus is used to melt away the material. In either instance, the resulting indicia is often ragged at the machined or melted edges and can be difficult to read.

Further, laminated tags that have adhesively joined laminations have a tenancy to de-laminate under wear and adverse weather conditions. Even a tear in a lamination can reduce or confuse visual access to the indicia on the tag.

Die stamped tags have also been used in which the indicia is stamped into the material of the tag body, leaving either a recessed area, or an opening through the tag thickness in the shape of the indicia. The latter type of tag is durable except that the openings may become obscured if the tag is placed against a backdrop surface of the same or similar color to the tag. The former type tag is difficult and time consuming to make especially if consecutive, different indicia is to be used on successive tags.

Thus a need has remained for more permanent visual indicia on identification tags.

BRIEF DESCRIPTION OF THE DRAWINGS

Preferred embodiments of the invention are described below with reference to the following accompanying drawings.

FIG. 1 is an enlarged frontal elevation of an animal tag embodying features of the present invention;

FIG. 2 is a bottom plan view of the tag shown in FIG. 1;

FIG. 5 is a perspective exploded view of the present tag; and

FIG. 6 is a diagrammatic view exemplifying the process for producing the present tags.

DETAILED DESCRIPTION OF THE PREFERRED EMBODIMENTS

Figure 3:
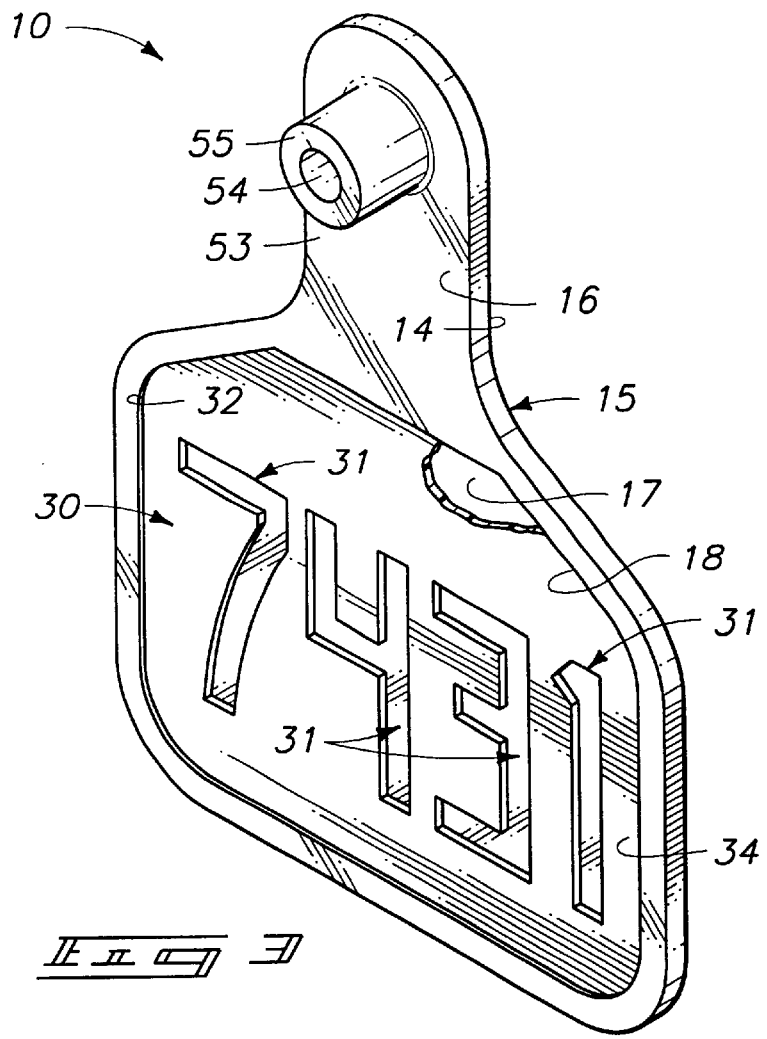
FIG. 3 is a perspective view of the present tag.

This disclosure of the invention is submitted in furtherance of the constitutional purposes of the U.S. Patent Laws "to promote the progress of science and useful arts" (Article 1, Section 8).

General Aspects

Before a detailed description is given, general aspects of the invention will be set forth.

In a first aspect, the present tag 10 is comprised of a first tag member 15 formed of a polymer and including a front surface 16, and a second tag member 30, formed of a polymer that visually contrasts with the first tag member. The second tag member 30 includes slots formed as visual indicia, extending through the second tag member and exposing the front surface 16 of the first tag member 15 through the slots 31. The second tag member 30 is welded to the front surface 16 of the first tag member 15 with the slots 31 opening against the front surface 16.

In another aspect, the tag 10 is comprised of a first tag member 15 formed of flexible thermoplastic material including a front surface 16 with a recess surface 17 formed therein and bounded by a marginal peripheral recess edge 18 extending from the recess surface to the front surface 16. A second tag member 30 includes outward edge surfaces 32 and is formed of flexible thermoplastic material but visually contrasting with the first tag member 15. The second tag member 30 is radio frequency welded to the first tag member 15, against the recess surface 17 and with the outward edge surfaces 32 adjacent the marginal peripheral recess edge 18. The second tag member 30 includes laser cut through slots 31 formed as visual indicia, extending through the second tag member 30.

In a further aspect, a process for producing an identification tag 10, is comprised of a number of steps, including obtaining a first tag member 15 including a front surface 16, followed by the step of laser cutting indicia through a second tag member 30. In another step, the second tag member 30 is radio frequency welded to the first tag member front surface 16.

Detailed Description

In exemplary forms, the present tag 10 is comprised of at least two components, the first tag member 15 and second tag member 30, permanently secured to the first tag member. It is preferred that both members be formed of similar if not identical material, but with the second tag member 30 being visually distinguishable from the first member 15. Most preferably, the visual distinction is made by providing a coloration distinction, and by slots 31 that extend through the second tag member to permit visual access to the differently colored first tag below. For example the first tag member 15 may be black in color and the second tag member 30 may be white. In this way, the distinctive colors will visually emphasize the indicia formed by the laser cut slots 31.

The preferred material for the tags is a flexible polyurethane that may be injection molded to form the first tag member 15, and preferably be provided in sheets or rolls for laser cutting and formation of the second tag member 30. It is preferable that the materials comprising the members 15, 30 be of such similar composition to facilitate welding, most preferably by radio frequency, of the two tag members. Flexible polyurethane may be welded by radio frequency and includes properties of resilience, high wear resistance, color fastness, and toughness that lend themselves well to manufacture and use in the present invention.

Radio frequency welding has been found to far surpass the bond produced by mechanical fasteners or by adhesives. Mechanically joined or adhesively joined tag members typically will not stay laminated in adverse conditions over long periods of time. Polyurethane tag members that are radio frequency welded, on the other hand, form an integral unit, with the two members 15, 30 fused together into one. Delamination is therefor not a likelihood regardless of wear or weather conditions over time. Further, the different pigmentation of the two members and the laser cut slots assure that the indicia will not easily erode with time and wear, especially as compared with prior tags where indicia was silk screened or otherwise applied as a coating on a substrate. More discussion regarding radio frequency welding of the tag components will be discussed later on in this application.

It is preferred that the first tag member 15 include at least one of the recess surfaces 17 to receive the second tag member 30. In the exemplified forms, it may be preferred to include two of the recess surfaces 17 on opposed sides of the first tag member 15 to receive two of the second tag members 30. In either instance, the recess surfaces 17 and second tag members 30 may be the same, and fastening by welding may be carried out in the same manner for both sides.

The recess or recess surface 17 may be integrally formed in the first tag member 15 by the same injection molding process used to form the tag body. Each recess surface 17 is defined by the edge 18, which may be of any desired shape. It may be formed to a depth in the first tag member 15 that is preferably at least equal to the thickness of the second tag member 30.

Figure 4:
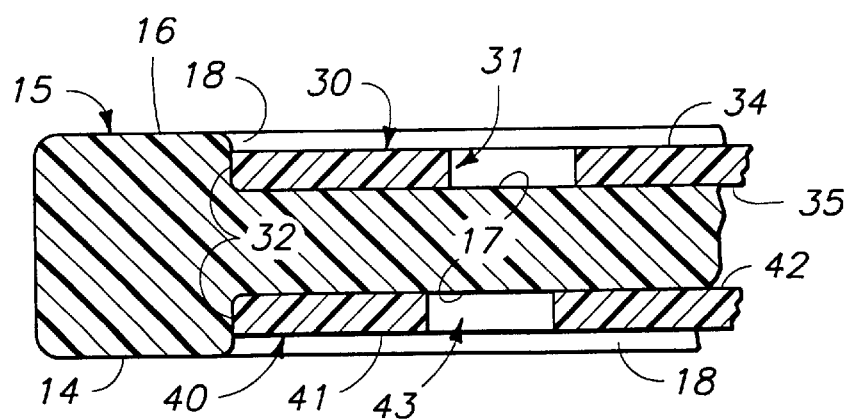
FIG. 4 is an enlarged fragmented sectional view of the present tag.

The examples illustrated in FIGS. 3 and 4 include a two sided, two recess first tag member 15 with recess surfaces 17 formed on opposite sides to depths that are greater than the thickness dimensions of the second tag members welded thereto. Most preferably each of the recess surfaces 17 will occupy a significant part of the adjacent surface of the first tag member 15, and the associated second tag member 30 will be of a complimentary shape so as to fit within the recess surface 17. Outer edges 32 of the second tag member will thus be adjacent to and be protected by the recess edges 18 of the first tag member 15.

The slots 31 formed in second tag member are most preferably laser cut through the thickness dimension thereof. A commercially available laser cutting machine 50 (FIG. 6) may be used to cut the indicia 31 and to cut the outline of successive second tag members 30 from a sheet or a roll. Two such rolls 55 are diagrammatically shown in FIG. 6, aligned so as to allow the laser 50 to cut two tag members simultaneously. Other arrangements including cutting single tags from a single roll or sheet could be used as well.

It is preferable that the indicia be laser cut, since the edges of the cuts will typically be sharp and crisp without a noticeable distracting raised edge, burr, or selvage formed above or to one side of the second tag member face. Such imperfections are typically found in instances where a die stamp, high speed etching tool, or a heated stylus is used to create indicia in polymer materials. Such raised edges are typically not consistent around the cut area, therefor creating unreliable visual access to the slot when viewed at an angle. Further, a raised burr or selvage can snag and cause obstruction of the adjacent indicia by accumulating snagged debris that can cover or partially obstruct visual access to the adjacent indicia.

It is also preferable to use laser cut indicia since commercially available laser cutters 50 can be operated to quickly cut successive indicia that may vary from one tag to another. For example, in many instances it may be desirable to provide a series of tags with a serial progression of indicia such as consecutive numbers, letters or combinations thereof. Commercially available laser cutters 50 may be programmed to cut such successive distinguishing indicia in the second tag members.

Further, the laser cutting operation may be performed in an substantially automated process in which the second tag members 30 are progressively cut from a sheet or roll of material prior to being affixed to successive first tag members 15. Still further, if two sides of a finished tag are to include the second tag members, with identical indicia on both sides, an indicia forming laser cut may be made simultaneously through two thicknesses of the preferred polymer material to form two substantially identical second tag members.

The first tag member 15 includes a front surface 16 and a back surface 14. The surfaces are preferably planar and spaced apart by the thickness of the member 15. The thickness dimension in a preferred form is between about 0.060 inches and 0.12 inches and most preferably approximately 0.090 inches. This dimension is preferably greater than that of the second tag member 30 to allow some reduction in thickness (about 0.03 inches) through the first tag member for formation of the recessed surface 17 and peripheral edge 18 to receive the second tag member 30.

The second tag member 30 also includes a front surface 34 and a back surface 35. The thickness dimension of the second tag member 30 is preferably constant and less than the thickness dimension of the first tag member 15. Most preferably, the thickness dimension of the second tag member 30 is slightly less than or not substantially greater than the depth of the recess surfaces 17 (about 0.03 inches). In a preferred example the second tag 30 includes a thickness dimension of approximately 0.02 inches. Such relatively thin material may be easily laser cut and can be easily welded by radio frequency welding to the first tag member 15.

The first and second tag members 15, 30 are affixed, with the front surface 16 of the first tag member 15 in flush abutment with the back surface 35 of the second tag member. This is preferably accomplished as indicated above, by radio frequency welding. With the preferred polyurethane materials and the preferred thickness dimensions related above, radio frequency welding of the components may be accomplished with a conventional radio frequency welding machine 60 at a frequency preferably of less than approximately 50 megahertz at a power intensity of between approximately 10 and 20 kilowatts. In a preferred example, tags of the above nature may be welded using a frequency of approximately 27 megahertz at a power intensity of between approximately 10 and 20 kilowatts.

In order to allow visual identification from a broad range of angles (front, back, sides) it may becomes desirable, as briefly indicated above, to provide indicia on both sides of the tag 10. In a preferred form, (FIGS. 4, 5) a third tag member 40 is provided, affixed to the back surface 14 of the first tag member 15.

The third tag member 40 may be substantially identical to the second tag member 30, and include the same (but not necessarily) indicia. As such, the third tag member may include a front surface 41 and a back surface 42, that may be substantially identical to those of the second tag member 30. The third tag member also includes through slots 43 that may be identical to the second member slots 31. Like slots 31, the through slots 43 are preferably formed as visual indicia, extending through the third tag member from the front surface 41 to the back surface 42.

The thickness dimension of the third tag member 40 is preferably the same as that of the second tag member 30. Thus the overall thickness dimension of the tag 10, at least in the area of the slots 31, 43 is the sum of the thickness dimensions of the first tag member (between the recess surfaces 17), the second tag member 30, and the third tag member 40. This total thickness may be approximately equal to the maximum thickness dimension of the first tag member.

The third tag member 40 may be permanently attached to the first tag member in the manner described above, using radio frequency welding. It is preferred, however that the three members be preheated before application of radio frequency to minimize the power requirements for the weld. Preheating to a temperature of between approximately 120° F. and 180° F. is generally desirable, and more specifically, preheating to approximately 150° F. is preferred.

In instances where the present tags are to be used for identification of animals, at least one tag member (preferably the first tag member 15) may be provided with an upstanding tab 53. An aperture 54 may be formed through the tab. The aperture 54 may be provided to receive a spike (not shown) or other tag securing device. A boss 55 may be provided about the aperture 54 to strengthen the tab against the spike or other fastener.

In the examples shown, only the first tag member 15 is provided with tabs and apertures. However, other variations where the two or three tag members are identical, all members may be provided with tabs and apertures.

In preferred forms of the present process, the first step is obtaining a first tag member 15 including a front surface 16. This may be done using injection molding processes by which the described first tag member 15 may be produced from a polymer, preferably a flexible injectable polyurethane material. Next, a laser cutting machine 40 may be used for the step of laser cutting indicia through a second tag member. During this step, the outline or marginal edges of the successive second tag members may also be cut. Further, as shown in the schematic in FIG. 6, second and third tag members 30 and 40 may be laser cut simultaneously from rolls 56 of the preferred material (which is most preferably the same material used for the first tag members 15).

Finally, the step of radio frequency welding the second tag member to the first tag member front surface 16 is performed. Most preferably, at least the first tag member 15 and preferably all tag members are pre-heated prior to the welding step, as graphically shown in FIG. 6 by heaters 65, to a pre-heated temperature between approximately 120° F. and 180° F., and most preferably approximately 150° F.

The pre-heated tag members 30, 40 are then aligned and fitted into the recess surfaces 17. It may be desirable at this point, that the third tag member be reversed prior or during this step in order to correctly orient the indicia thereon, otherwise letters or numbers could appear as an illegible mirror image. If indicia is used that is visually symmetrical, or that is not directionally sensitive, there is no need to include a reversal step.

It is preferred that the second tag members 30 (and third tag members 40 if used) be pressed into the recessed surfaces 17 following the laser cutting step, and preferably during the welding step. This can be accomplished by the welder 60. The radio frequency welder 60 may thus be operated to press and weld the tag members together preferably using radio frequency of less than approximately 50 megahertz (preferably about 27 megahertz) at a power intensity of between approximately 10 and 20 kilowatts. This effectively welds the tag members together, completing the formation of the finished tag.

When manufactured as described above and attached to an animal, the present tag 10 is nearly indestructible and will clearly show the identification indicia for the life of the animal. This is due to the contrasting materials of the first, second, and third (if used) tag members, superimposed on one another and with the slots clearly outlining the selected indicia. As there is no "painted" on indicia, there is nothing exposed to wear other than the tag materials themselves. Since the tag materials are selected from materials known for long life and excellent wear properties, the indicia will inherently last as long as the materials forming them.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An identification tag, comprising:
  a first tag member formed of a polymer and including a front surface;
  a second tag member formed of a polymer that visually contrasts with the first tag member;
  wherein the second tag member includes slots formed as visual indicia, extending through the second tag member and exposing the front surface of the first tag member through the slots;
  wherein the second tag member is welded to the front surface of the first tag member with the slots opening against the front surface of the first tag member; and
  wherein the first tag member includes a back surface and further comprising a third tag member with slots forming visual indicia and welded to the back surface.

2. An identification tag as claimed by claim 1 wherein the first and second tag members are secured together by radio frequency welding.

3. An identification tag, comprising:
  a first-tag member formed of a polymer and including a front surface;
  a second tag member formed of a polymer that visually contrasts with the first tag member;
  wherein the second tag member includes slots formed as visual indicia, extending through the second tag member and exposing the front surface of the first tag member through the slots;

wherein the second tag member is welded to the front surface of the first tag member with the slots opening against the front surface of the first tag member; and wherein the first and second tag members are formed of thermoplastic elastomeric material and are secured together by radio frequency welding.

4. An identification tag, as claimed by claim 3, wherein the slots are laser cut through the second tag member.

5. An identification tag, as claimed by claim 3, wherein the first and second tag members are formed of at least substantially similar thermoplastic materials.

6. An identification tag, comprising:

a first tag member formed of a polymer and including a front surface;

a second tag member formed of a polymer that visually contrasts with the first tag member;

wherein the second tag member includes slots formed as visual indicia, extending through the second tag member and exposing the front surface of the first tag member through the slots;

wherein the second tag member is welded to the front surface of the first tag member with the slots opening against the front surface of the first tag member; and wherein the first tag member includes a recessed surface along the front surface and wherein the second tag member is welded to the first tag member within the recessed surface.

7. An identification tag, comprising:

a first tag member formed of a polymer and including a front surface;

a second tag member formed of a polymer that visually contrasts with the first tag member;

wherein the second tag member includes slots formed as visual indicia, extending through the second tag member and exposing the front surface of the first tag member through the slots;

wherein the second tag member is welded to the front surface of the first tag member with the slots opening against the front surface of the first tag member; and wherein the first tag member includes a recessed surface along the front surface and wherein the second tag member is radio frequency welded to the first tag member within the recessed surface.

8. An identification tag, comprising:

a first tag member formed of flexible thermoplastic material including a front surface with a recess surface formed therein and bounded by a marginal peripheral recess edge extending from the recess surface to the front surface;

a second tag member having outward edge surfaces and formed of flexible thermoplastic material but visually contrasting with the first tag member;

wherein the second tag member is radio frequency welded to the first tag member against the recess surface and with the outward edge surfaces adjacent the marginal peripheral recess edge; and wherein the second tag member includes laser cut through slots formed as visual indicia, extending through the second tag member.

9. An identification tag, as claimed by claim 8, wherein the second tag member includes a thickness dimension that is less than a distance dimension from the recess surface to the front surface of the first tag member.

10. An identification tag, as claimed by claim 7, wherein the first and second tag members are formed of polyurethane.

\* \* \* \* \*

UNITED STATES PATENT AND TRADEMARK OFFICE
CERTIFICATE OF CORRECTION

PATENT NO.     : 6,497,062 B1
DATED          : December 24, 2002
INVENTOR(S)    : Gene T. Koopman et al.

It is certified that error appears in the above-identified patent and that said Letters Patent is hereby corrected as shown below:

Column 2,
Line 28, after "slots", insert -- 31 --.
Line 29, after "second tag member", insert -- 30 --.

Column 8,
Line 32, delete "7", and insert -- 8 --.

Signed and Sealed this

Tenth Day of February, 2004

JON W. DUDAS
*Acting Director of the United States Patent and Trademark Office*